Oct. 28, 1969   R. W. LINDER   3,474,954
ROTARY VOLUMETRIC MACHINE
Filed Feb. 27, 1968   8 Sheets-Sheet 1

Fig.1

René Linder

Fig. 3

Oct. 28, 1969     R. W. LINDER     3,474,954
ROTARY VOLUMETRIC MACHINE Filed Feb. 27, 1968     8 Sheets-Sheet 4

Fig.4

Oct. 28, 1969  R. W. LINDER  3,474,954
ROTARY VOLUMETRIC MACHINE
Filed Feb. 27, 1968  8 Sheets-Sheet 6

Oct. 28, 1969 R. W. LINDER 3,474,954
ROTARY VOLUMETRIC MACHINE
Filed Feb. 27, 1968 8 Sheets-Sheet 8

*Fig.8*

3,474,954
ROTARY VOLUMETRIC MACHINE
Rene Werner Linder, Rue General Dufour 2,
La Chaux-de-Fonds, Switzerland
Filed Feb. 27, 1968, Ser. No. 708,549
Claims priority, application Switzerland, Dec. 7, 1967,
17,292/67
Int. Cl. F04c 17/04, 17/02
U.S. Cl. 230—141                    12 Claims

ABSTRACT OF THE DISCLOSURE

A rotary volumetric machine has an oblong rotor with cylindrical ends, and coupled at is centre to a transmission shaft passing perpendicularly through its place of rotation. The rotor rotates in a housing in which three cylindrical arcuate chambers are formed at 120° from one another each corresponding in diameter to that of the rotor ends, and separated sealingly by three rollers of which two always contact the rotor ends and a third the central part of the rotor so that with relative rotation of rotor and housing, the volumes of the chambers are cyclically varied. The relative dimensions of the rotor and cylinder are governed by specified mathematical relationships. Either the housing or the rotor or both may be mobile. The rotor may drive or be driven by the transmission shaft and co-operate with valves to constitute a motor or a pump.

---

The present invention relates to a rotary volumetric machine. More particularly it relates to a rotary volumetric machine, comprising at least one rotor revolving inside a fluid-tight casing, the said rotor being consitituted by a body of oblong form of which the rounded ends represent segments of cylinders and of which the centre is arranged in a manner that the rotor is driven by a transmission shaft or drives the said shaft which passes through it, perpendicularly to the plane of rotation of machine, the casing being constituted by at least one cylinder closed by discs and in which three chambers are cut out having a diameter corresponding to the ends of the rotor and arranged in circular arcs, facing the centre, at 120° from one another.

In all known machines of this type, engineers have not found a solution for obtaining an invariable value between the axis of rotation of the piston or rotor and the axis of the machine, that is to say, of the interaxial distances separating the two principal centres, and have sought to resolve this problem by empirical means, among other, by arranging, on the cylinder, movable shoes of separation of the chambers, changing the form of the aration of the chambers, changing the form of the rounded ends of the rotor or, again, arranging eccentrically a driving gear on the transmission shaft. All these solutions are shown to be irrational for the construction and unsatisfactory by the results obtained.

It is an object of the present invention to remedy these drawbacks.

According to the invention there is provided a rotary volumetric machine, comprising at least one rotor revolving inside a fluid-tight casing, said rotor being constituted by a body of oblong form, of which the rounded ends represent segments of cylinders having centres M, N located on the major axis of the rotor and at equal distances from the centre G of the casing, and of which the centre is arranged in such a manner that the rotor is coupled to a transmission shaft which passes through it perpendicularly to the plane of rotation of the machine, the casing being constituted by at least one cylinder closed by discs and in which cylinder are cut three chambers having a diameter corresponding to the ends of the rotor and arranged in circular arcs, facing the centre, at 120° from one another, wherein three rollers separate said chambers from one another, at least two said rollers being always in contact with the rounded ends of the rotor, a third said roller being always in contact with the central part of said rotor and which part is limited in its contour by tangential points, so that fluid-tightness is obtained between the three rollers and the perimeter of the rotor, thus isolating said three chambers from one another and of which the volume varies according to the position of the rotor, which variation causes aspiration or compression in the said chambers, the centre of symmetry O of the casing and the centre of symmetry G of the rotor being separated by a distance equal to $e$, which distance remains invariable during the whole revolution of the rotor of which the centre G remains always equidistant from the centre O of the machine, the distance $a$ separating the centre O of the casing from the centres A, B, C of the rollers being equal to $5e+3e\cdot\sqrt{3}$, the total distance which separates said centres M, N being equal to $2e+2\Delta e$, where $\Delta e$ is equal to $$\frac{e}{\cos 30°}$$

and the length of said major axis of the rotor being equal to $2R+2\Delta e+2e$ and its width to $2R+2\Delta e-2e$, where R is the radius of said ends of the rotor and equals $$a-(\Delta e+s)$$

where $s$ represents the radius of the rollers.

The accompanying drawing shows, diagramatically and by way of example, one embodiment of the rotary volumetric machine according to the invention. In the drawings.

Figure 1:
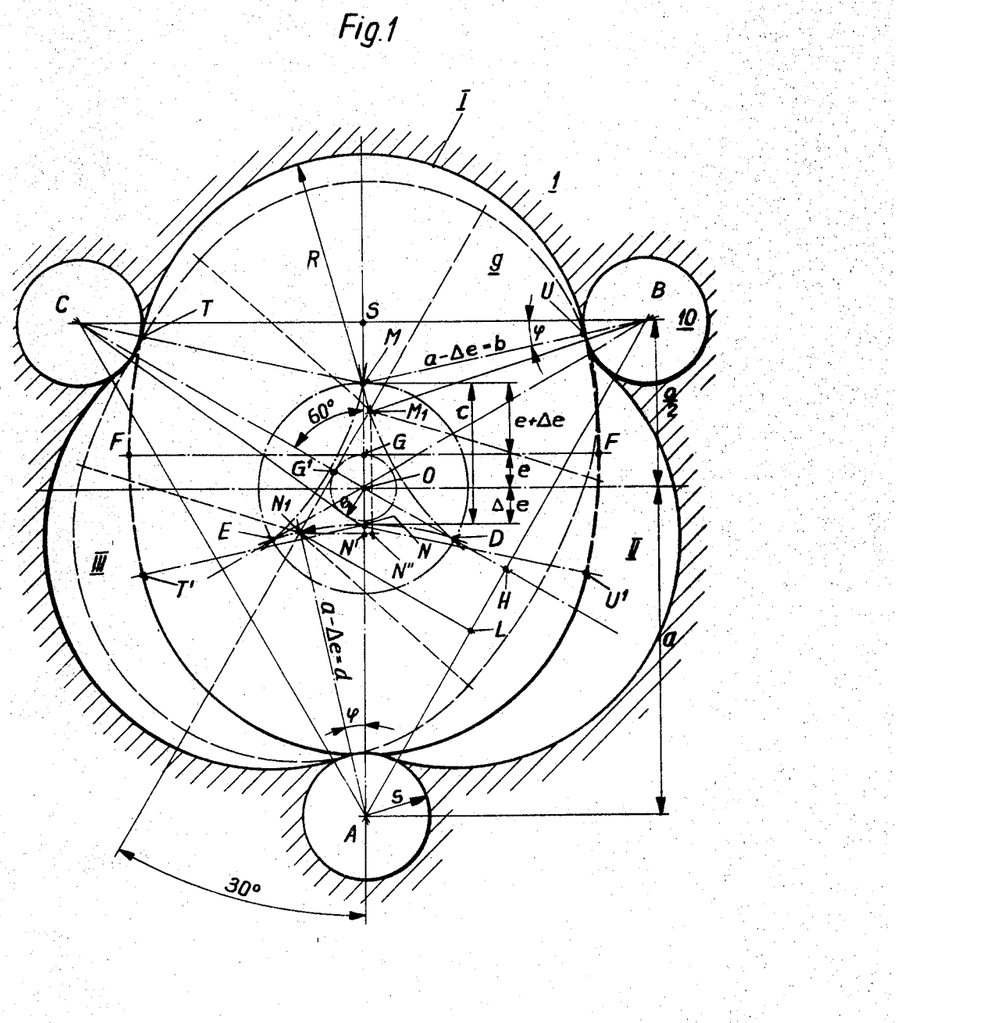
FIG. 1 is a representation of the geometry of the movement for compression (full lines) and for aspiration (dashes)

To explain the geometry of the motion, reference is made to FIG. 1, in which:

O = the centre of symmetry of the movement and of the cylinder.
G = centre of symmetry of the piston.
A, B, C = centres of the rollers connecting the chambers between them.

They form the apices of an equilateral triangle.

M, N = centres of the ends shown by the segments of the cylinders of the piston.
M, D, E = centres of the chambers cut out inside the cylinder and apices of a concave triangle showing the path followed by M and N during the revolution of the piston.
R = radius of the ends of the piston.
S = radius of the rollers separating the chambers.

$e = \overline{OG}$ = interaxial distance separating the two principal centres of movement.

$$\Delta e = \overline{ON} = \left(\frac{e}{\cos 30°}\right) = \left(\frac{2e}{\sqrt{3}}\right)$$

$$a = \overline{OA} = \overline{OB} = \overline{OC} = 5e + 3e \cdot \sqrt{3}$$

$$\overline{GM} = \overline{GN} = e + \Delta e = e + \frac{2e}{\sqrt{3}}$$

$$\overline{HA} = \overline{HB} = \left(\frac{a \cdot \sqrt{3}}{2}\right)$$

$$\overline{HL} = e + \Delta e = e + \frac{2e}{\sqrt{3}}$$

$\overline{FF}$ = tranverse median of the piston = $2R + 2\Delta e - 2e$.
$\overline{TT'} = \overline{UU'}$ = the tangential points and the contour of the central part of the piston connecting the rounded ends.

So that the interaxial distance does not vary during the operation of the machine, three invariable data condition the construction, namely:

(1) The value of the interaxial distance $e$.
(2) The value of $a$ which is fixed by the centres of the rollers.
(3) The distances $\overline{GN}$ and $\overline{GM}$ which are the interaxial distances which condition the construction of the piston.

To facilitate the control of the movement, which enables the rapid development of a construction project, a relationship is necessary between, on one hand, $e$ and $\Delta e$ and, on the other hand, between $e$ and $a$. The balancing of this movement has shown that the triangle formed by MBS (of which M is the centre of one end of the piston) is equal to the triangle $N_1AN'$ of which $N_1$ is the centre of the opposite end of the piston after a displacement of 30° from the latter.

Given that one can determine $\overline{N_1N'}$ the following equation gives the value of $a$ with respect to $e$:

$$\overline{N_1N'} = \overline{SM} = \frac{e+\Delta e}{2} + \frac{e\cdot\sqrt{3}}{2} + \frac{e+\frac{2e}{\sqrt{3}}}{2} + \frac{e\cdot\sqrt{3}}{2}$$

$$\overline{OM} = 2e + \Delta e = 2e + \frac{2e}{\sqrt{3}}$$

$$\overline{OS} = \frac{a}{2}$$

whence:

$$a = 2\left(\frac{e+\frac{2e}{\sqrt{3}}}{2} + \frac{e\cdot\sqrt{3}}{2} + 2e + \frac{2e}{\sqrt{3}}\right) = e + \frac{2e}{\sqrt{3}} + e\cdot\sqrt{3} + \frac{4e}{\sqrt{3}} +$$

$$4e = 5e + \frac{6e}{\sqrt{3}} + e\cdot\sqrt{3} = 5e + \frac{6e\cdot\sqrt{3}}{3} + e\cdot\sqrt{3} = 5e + 3e\cdot\sqrt{3}$$

or $$e = 1$$

$$\Delta e = \frac{2e}{\sqrt{3}} = \frac{2}{1.73205} = 1.1547e$$

$$a = 5e + 3e\cdot\sqrt{3} = 5 + 3\cdot 1.73205 = 5 + 5.19615 = 10.19615e$$

A rotation of 360° of piston is made up of 12 successive displacements of 30° each, equal and reversible, which place the piston alternately in position of compression and of aspiration, thus occupying or freeing alternately each of the chambers of the cylinder, these operations following one another in the direction of rotation of the piston. During its rotation, the rounded ends of the piston going from T to U and from U' to T' are always in contact with at least two of the rollers of which the centres are A, B, or C, the centres M and N of the ends of the piston following a path equidistant from A, B or C, which path is represented by the curved triangle MDE, whilst the third roller is on contact with one or other of the central parts of the piston $\overline{TT'}$ and $\overline{UU'}$ which lines can be calculated point by point starting from the altitude of the triangles successively formed by a displacement of 30° of the piston, or, in FIG. 1, the triangle formed by MCN of which the base $\overline{MN}$ is displaced to $\overline{M_1N_1}$ and of which the invariant length is $2e + 2\Delta e$. Since the movement is reversible, this single calculation suffices and applies to the other half.

The control of the position of the centres of the rounded ends of the pistons with respect to the centre of the rollers corresponds to the following equations:

$$\overline{NA} = \overline{OA} - \overline{ON} = a - \Delta e$$

For the "compression" position:

$$\overline{MB} = \overline{NA} = b = \sqrt{\left(\frac{a\cdot\sqrt{3}}{2}\right)^2 + \left[\left(\frac{a}{2}\right) - (2e + \Delta e)\right]^2} = a - \Delta e$$

For the "aspiration" position:

$$\overline{N_1A} = \overline{M_1B} =$$

$$\sqrt{\left[\left(\frac{a\cdot\sqrt{3}}{2}\right) - (e + \Delta e)\right]^2 + \left[\left(\frac{a}{2}\right) + e\right]^2} = a - \Delta e$$

On the other hand, during a displacement of 30° of the piston, the centre G of the latter is displaced to G' along an equidistant path from 0 to 60°. The centre of the piston is hence displaced at an angular speed equal to double the angular speed of the piston, but in the opposite direction. Each position of the displacement of centre G must correspond to the following equations, in altitude:

$$\cos\varphi\cdot d + \cos\varphi\cdot c + \sin\varphi\cdot b = \frac{a\cdot 3}{2}$$

in width:

$$\cos\varphi\cdot b + \sin\varphi\cdot c - \sin\varphi\cdot d = \frac{a\cdot\sqrt{3}}{2}$$

The distance separating the centre G of the piston from the symmetrical centre of movement and of the cylinder O corresponds to the following equation, in each position of the piston:

$$\sqrt{\left(\cos\varphi\cdot d + \frac{\cos\varphi\cdot c}{2} - a\right)^2 + \left(\cos\varphi\cdot b + \frac{\sin\varphi\cdot c}{2} - \frac{a\cdot\sqrt{3}}{2}\right)^2}\ e$$

These controls prove the position of the movement where the centre G is always equidistant from the centre of symmetry O whilst the perimeter of the piston is always in contact with the rollers of which the centres are A, B and C.

In FIG. 1 and figuratively, if it is desired to bring back G' to G, it is necessary to turn the cylinder by 60° in the clockwise direction, which is the direction in which the piston was displaced. This operation will also increase the displacement of the piston by 60° in the clockwise direction without its position being changed inside the chambers of the cylinder. There is then a total rotation of 90° for the piston against a rotation of 60° for the cylinder, both in the same direction, which gives an angular speed of $\omega$ for the cylinder and $3\omega/2$ for the piston, which can be verified in FIG. 2, where the centres O and G are fixed, the rotation of the cylinder thus enabling the piston to turn on a fixed axis, avoiding the imbalance that the piston would cause and which it would be necessary to balance by turning around the centre O as shown in FIG. 1 where the cylinder is fixed.

Figure 2:
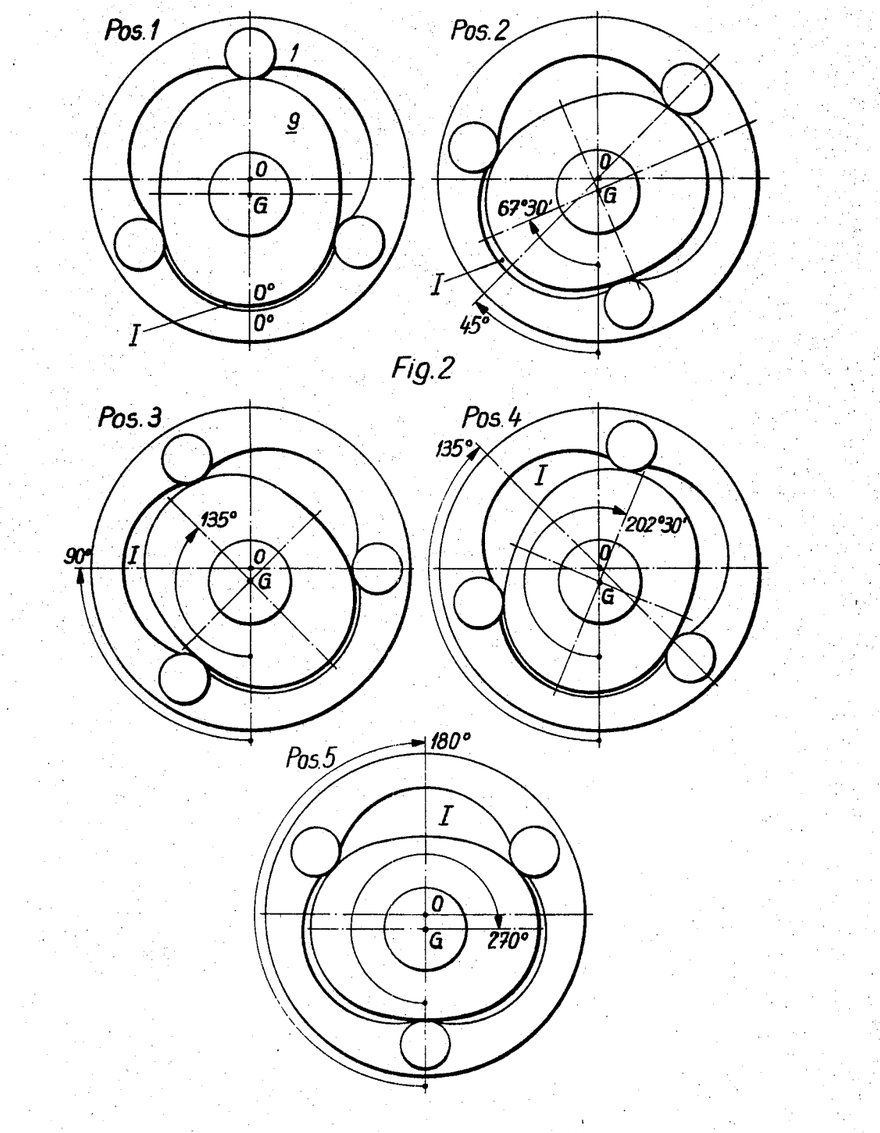
FIG. 2 shows the successive displacements of the casing from 45° to 45° and the corresponding displacements of the rotor or piston.

It is seen in FIG. 2, position 1, that the chamber 1 is at the end of compression to be, at position 5, at the end of aspiration, the cylinder having made a rotation of 180° while the piston has made one of 270°, whence it is observed that:

(a) The aspiration begins, for each chamber, at 0° to finish at 180°.

(b) Compression begins, for each chamber, at 180° to finish at 360°.

(c) At each turn of the cylinder there are produced three aspirations and three compressions, each of these movements being alternately displaced by 60°.

Figure 3:
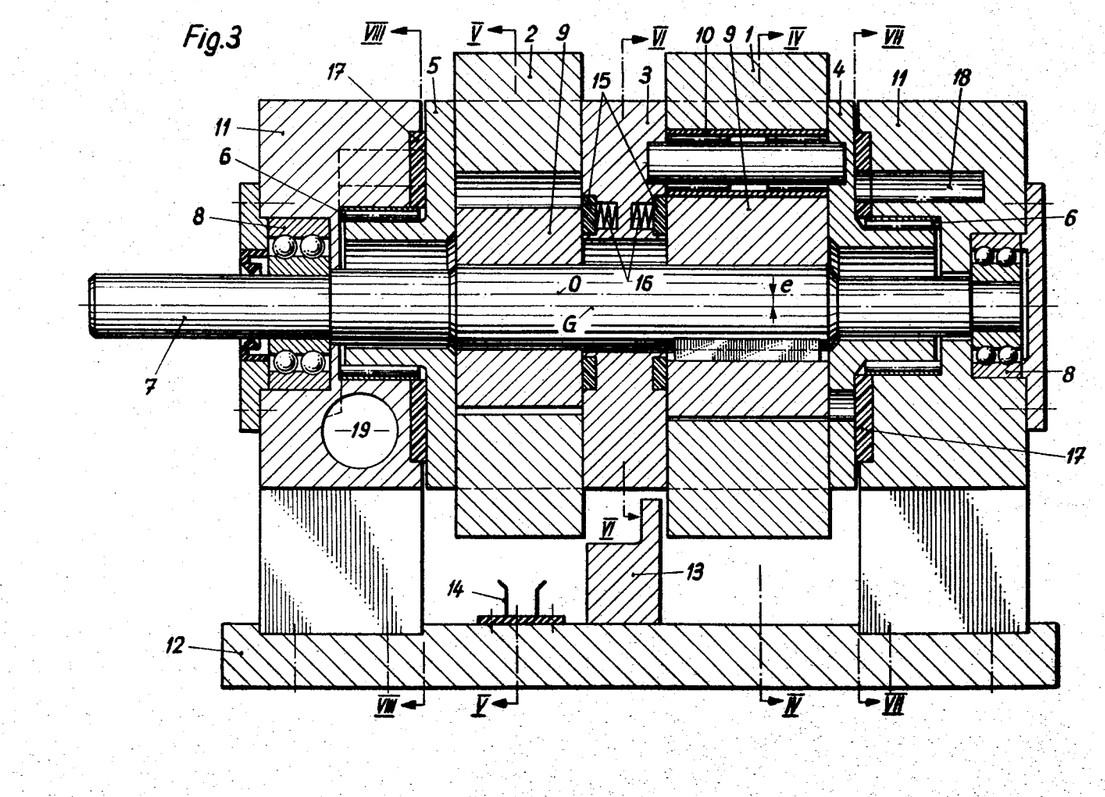
FIG. 3 is a transverse section of the machine, in the case of a motor.

In FIG. 3, there is shown a motor group composed of two cylinders 1 and 2 connected by a disc 3 and covered by two other discs 4 and 5, the whole forming two rotating casings connected together, having central bores and turning on the axis O by means of two needle bearings 6 mounted in supports 11 which form part of the base of the motor 12. A shaft 7, supported by two ball bearings 8, traverses these casings and turns, on the axis G, driving thereby two rotating pistons 9 which revolve inside the casings, the axis G being spaced from the axis O by a value equal to $e$.

Figure 4:
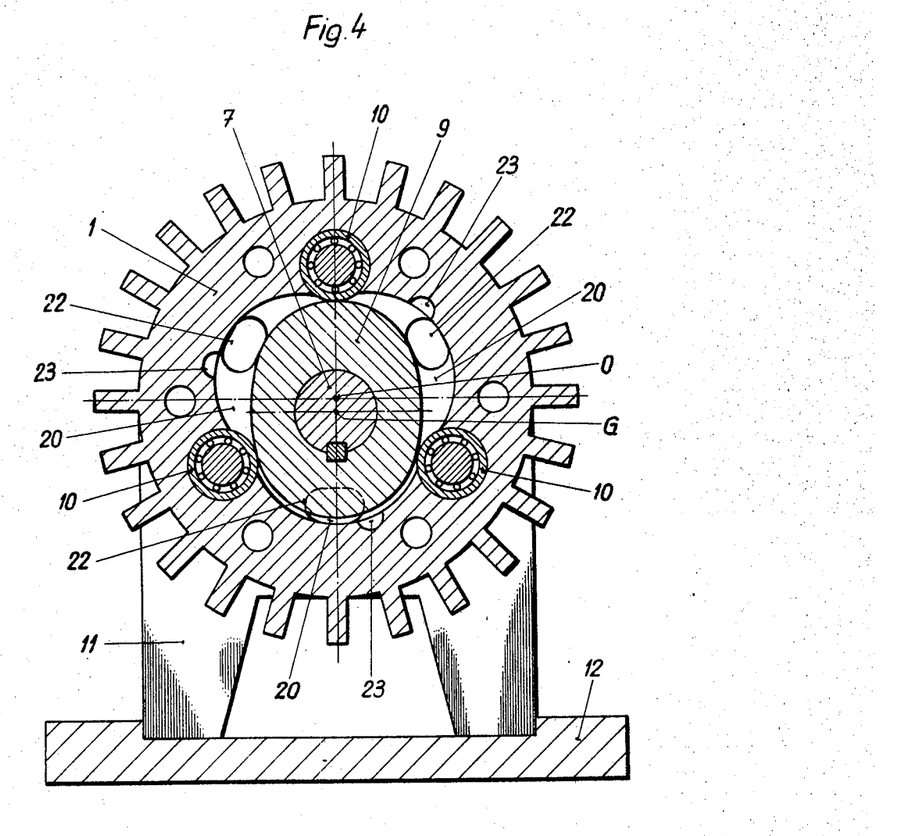
FIG. 4 is a section along the line IV—IV of FIG. 3.

FIG. 4 shows, in section along the line IV—IV of FIG. 3, the cylinder 1 inside of which revolves the rotating piston 9 fixed on its shaft 7 and turning on the axis G to enter and leave alternately each of three chambers 20 arranged in an arc of a circle, facing the centre, at 120° from one another and separated between themselves by three rollers 10 of which the shafts are located in the discs 3 and 4 (FIG. 3), the centres of these rollers being at 120° from one another and spaced from the centre O of the cylinder by a distance equal to $5e+3e.\sqrt{3}$. The part of these wheels in contact with the piston 9 act as rings and it is always in contact with the perimeter of the piston and spaced from the bottom of the chamber which faces it, by a distance practically equal to the length of the piston. In the disc 4, visible at the bottom of the cylinder, three openings 22 are bored to enable the entry of the air-gasoline mixture which will be compressed in this cylinder.

Figure 5:
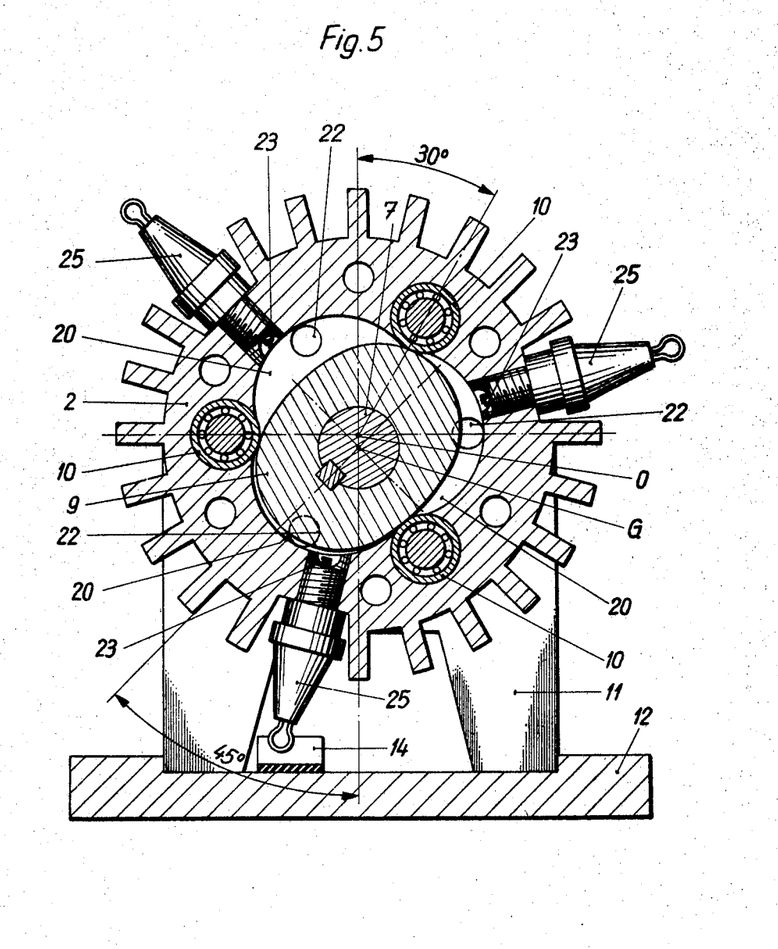
FIG. 5 is a section along the line V—V of FIG. 3.

FIG. 5 shows, in section along the line V—V of FIG. 3, the cylinder 2 covered by the disc 5. The position of this cylinder is displaced by 30° in the clockwise direction with respect to the cylinder 1, and the piston 9 by 45° with respect to the other piston, so that the said piston is already in a descending phase and allows a free space inside the chamber which it occupied totally before the 30° rotation of the cylinder, so that the transfer of compressed gases may be effected from the opening of a valve 24 (FIG. 6) which communicates with canals and grooves 23 which are opened between 30° or 40° of rotation of the casing before the piston 9 of the cylinder 1 reaches its top dead centre to be closed at the top dead centre of the said piston. A little before the closing of the valve 24, the plug 25 which touches in passing a contact 14 gives a spark which fires the gases of which the increase in pressure, following their firing, gives rise to the driving phase of the motor before passing to the exhaust, which is the last phase and will be done through the openings 22 located in the disc 5, which openings communicate, at the desired moment, with the exhaust.

Figure 6:
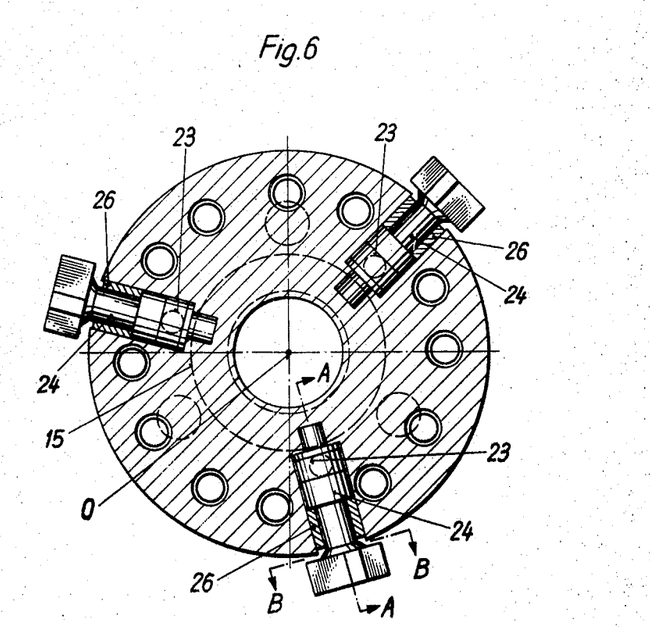
FIG. 6 is a section along the line VI—VI of FIG. 3 and FIGS. 6a and 6b of sections along the lines A—A and B—B of FIG. 6.
Figure 6A:
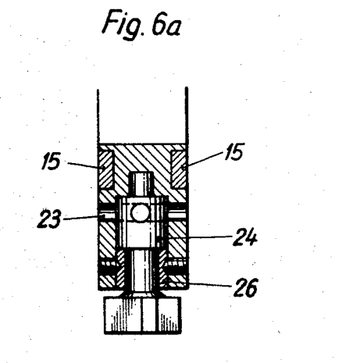
Figure 6B:
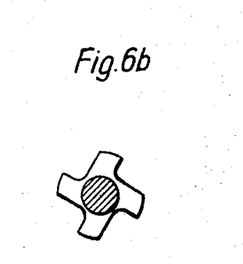

FIG. 6 shows, in section along the line VI—VI of FIG. 3 the disc 3. Three rotating valves 24 held by bronze rings in two segments 26, obstruct or free the channels 23 which connect the two cylinders (FIG. 6a). During the rotation of the cylinders the valves, of which the end is terminated in a "Maltese Cross" (FIG. 6b) meet a double stop 13 (FIG. 3) and turn at each stop by a quarter turn, opening or closing the passage of the channels 23. Hardened steel rings 15 supported by springs 16 (FIG. 3) are housed in the disc 3, on each side and ensure the lateral sealing of the movement.

Figure 7:
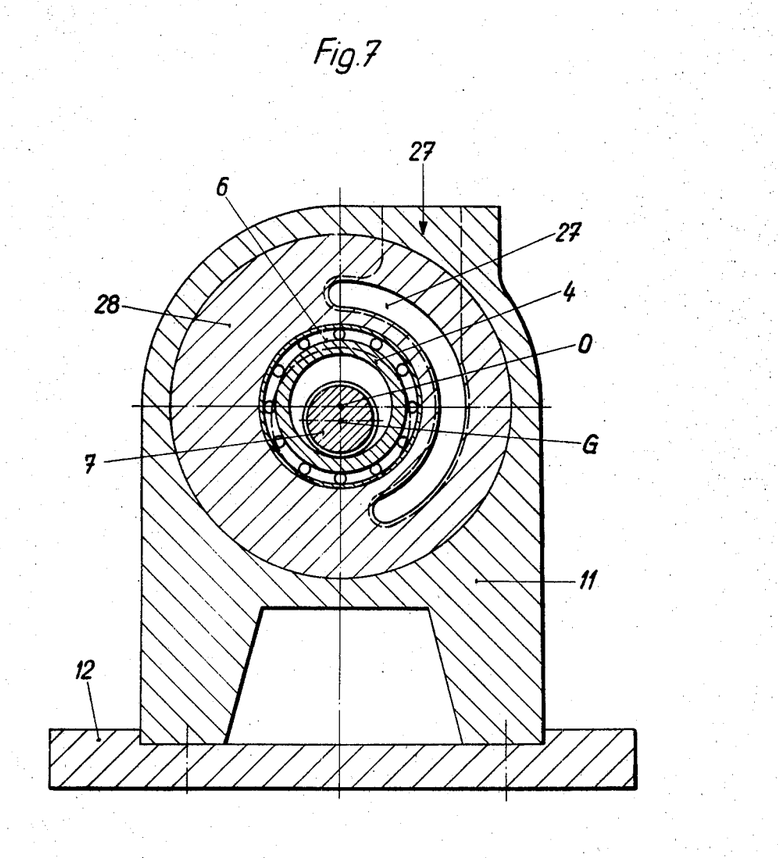
FIG. 7 is a section along the line VII—VII of FIG. 3.

FIG. 7 shows, in section along the line VII—VII of FIG. 3, the inner face of the support 11 supporting the motor and where the intake manifold 27 is cut out at the entrance to which is fixed the carburettor. A disc of self-lubricating plastics material resistant to heat 28 is located on the interior of the support surface, supported by springs (not shown) and in which the opening of the manifold is cut out, ensures sealing between the said support and the disc 4 of the motor. The manifold is cut out over about 180°, which corresponds to the aspiration time.

Figure 8:
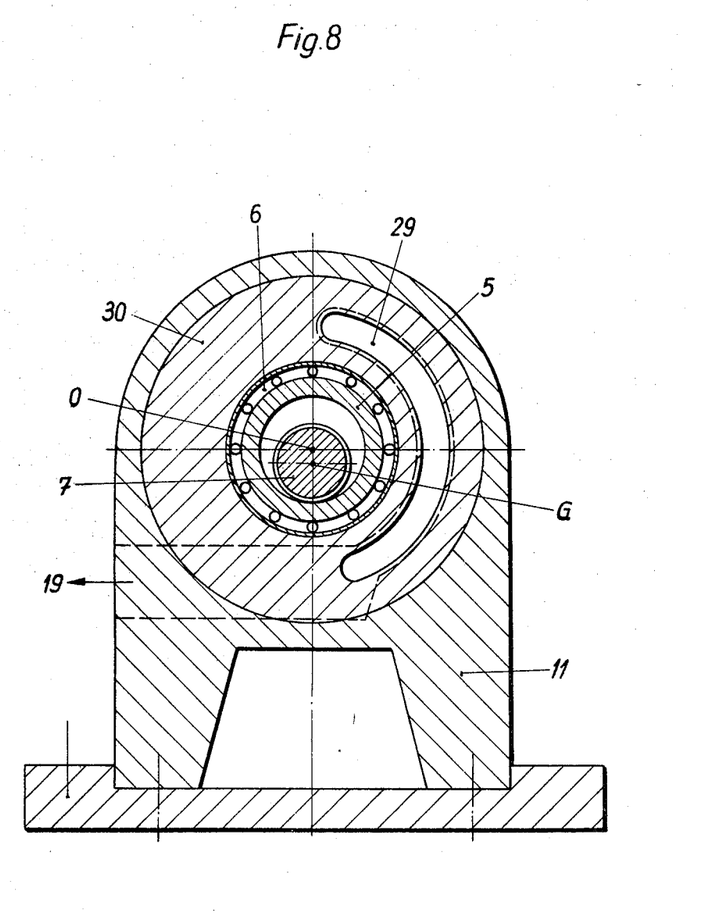
FIG. 8 is a section along the line VIII—VIII of FIG. 3.

FIG. 8 shows, in section along the line VIII—VIII of FIG. 3, the inner surface of support 11 supporting the motor and where the exhaust manifold 29 is cut out with the exit 19 (FIG. 3) where the exhaust tube will be fixed. As in FIG. 7, a disc 30, identical with disc 28, is housed here. The manifold is also cut out over about 180° and corresponds also to the time of exhaust.

In a variation not shown, there may be provided oscillating bearing rings placed around the rollers 10 and centred on the axis of the latter. Other rings urged by springs, ensure sealing between the rollers 10 and the rotating piston 9, thereby facilitating the holding of the film of oil at these places, as is done by the rings of an ordinary motor.

In the motor described above, the compressor cylinder 1 may have a greater thickness than that of the motor cylinder 2, so as to obtain a higher level of compression. On the other hand, there is the possibility of adding oscillating bearing rings, controlled by the displacement itself of the piston 9, which bearing rings enable the holding of the film of oil on the rollers in perfect manner and, thereby, give the possibility of perfecting the seal between the chambers of the compressor cylinder 1. This possibility can be kept under consideration in view of small losses which can occur between the chambers, but if, as has been provided, the thickness of the compressor cylinder is greater than that of the motor cylinder, these losses can be easily compensated. As for the motor cylinder 2, it is not necessary to add bearing rings thereto in view of the back-pressures existing in the two adjacent chambers at the moment of the entry of the compressed gases into the third chamber.

With respect to motors currently used, the motor described has the following advantages:

(a) Elimination of the crankshaft and of connecting rods and, hence, elimination of all imbalance and balancing, since each of the two masses in movement (cylinders and pistons) is rotative and turns on its own axis.

(b) Elimination of the camshaft, of the distributor and of all alternating movement.

(c) Reduction in bulk.

(d) Speed of motor shaft increased by 50%.

(e) Elimination of flywheel, since the masses in movement suffice.

(f) Elimination of cooling system, the fins provided on the cylinders acting as ventilator. If the fairing of the motor by a tunnel is provided there is produced a strong current of air.

(g) Simplification of the ignition system by elimination of the distributor and of spark-plug cables.

The geometry of the motion described may be applied to the construction of a number of other machines, among others: variators of speed, hydraulic brakes, high pressure pumps, hydraulic motors for the control of machine tools, heat engines, compressors for air or any gas, vacuum pumps, and pumps of plastics for the chemical industry, the latter being usable with fluids, liquids and gases under pressure or for the transport of the latter. Trials carried out on the regularity of the flow emerging from these machines, have given a flow of exceptional regularity, an important advantage for avoiding vibrations and their consequences.

From explanations provided with regard to FIGS. 1 and 2 showing the geometry of the motion and of FIGS. 3 to 8 of a practical embodiment of a motor, it emerges that, apart from the base or the frame, the machine comprises two essential parts constituting two quite distinct masses, being, on the one hand, the casing or group of casings and, on the other hand, the one or more rotors.

Each of these masses has its own axis which is the centre of a perfect balance for each of them. Taking this into consideration, it is possible to develop two groups of machines (a) and (b) which differ only by the number of masses in rotation and which are reversible.

(a) Only the rotor is in motion and the casing is immobile.

During its revolution, the motor is driven, either by a toothed wheel fixed and centred on the transmission shaft which passes through the envelope at the centre of the latter, which wheel is in engagement with an internally toothed crown located at the centre of the rotor, or by an eccentric fixed on the said shaft and located at the centre of a needle bearing which itself is placed at the centre of the rotor. In these two constructions the centre of the rotor during the rotation of the latter, turns around the centre of the casing which is the centre of the machine, at equidistance from this centre, but in opposite direction to the direction of rotation of the rotor and being displaced at an angular speed double that of the rotor. There follows an imbalance caused by the mass of the rotor turning around the centre of the machine, which imbalance increases with the speed of rotation of the rotor and the weight of the latter, but which can be easily compensated by constructing machines with two or several casings connected together, but arranged in such manner that the respective centres of the rotors are distributed equally around the centre of the machine to balance the motion.

The basis of all calculation relating to the construction of such a machine is the value of the interaxial distances which separate the two principal centres of motion, namely the centre of the casing and the centre of the rotor. This value is and remains invariable in all successive positions that the rotor occupies inside the casing. On the other hand, each chamber is connected to the exterior by a supply pipe and by an exhaust pipe, of which pipes the opening and closing is controlled by valves of known construction.

(b) The two masses are rotary and turn on their own axis which is fixed and distant from the other by a value equal to that of the selected interaxial distance, the said masses being supported by the walls of a housing or the supports of a base.

The rotor drives or is driven by the casing by means of three rotating rollers arranged inside the said casing. The angular speed of the rotor is equal to the sum of the angular speed of the casing plus a half of the latter. Due to the difference in angular speed, the two masses in motion are simultaneously displaced by 180° for the casing and by 270° for the rotor and, during this time, each chamber is displaced by 180°, which is equal to the displacement of each chamber in passing from the compression phase to the intake phase, or vice versa. This enables the elimination of valves and of replacing them by apertures, since the sum of the times of intake and of the times of compression is equal to a complete turn of the casing and provides the possibility of division into equal parts, either of the housings, or of the openings corresponding to the apertures of the casing.

It will be understood that many changes and structural modifications of the embodiment described above are possible all of which are to be considered as within the scope of the invention as defined by the appended claims.

I claim:

1. A rotary volumetric machine, comprising at least one rotor revolving inside a fluid-tight casing, said rotor being constituted by a body of oblong form, of which the rounded ends represent segments of cylinders having centres (M, N) located on the major axis of the rotor and at equal distances from the centre (G) of the rotor, and of which the centre is arranged in such a manner that the rotor is coupled to a transmission shaft which passes through it perpendicularly to the plane of rotation of the machine, the casing being constituted by at least one cylinder closed by discs and in which cylinder are cut three chambers having a diameter corresponding to the ends of the rotor and arranged in circular arcs, facing the centre, at 120° from one another, wherein three rollers separate said chambers from one another, at least two said rollers being always in contact with the rounded ends of the rotor, a third said roller being always in contact with the central part of said rotor and which part is limited in its contour by tangential points, so that fluid-tightness is obtained between the three rollers and the perimeter of the rotor, thus isolating said three chambers from one another and of which the volume varies according to the position of the rotor, which variation causes aspiration or compression in the said chambers, the centre of symmetry (O) of the casing and the centre of symmetry (G) of the rotor being separated by a distance equal to $e$, which distance remains invariable during the whole revolution of the rotor of which the centre (G) remains always equidistant from the centre (O) of the machine, the distance $a$ separating the centre (O) of the casing from the centres (A, B, C) of the rollers being equal to $5e+3e.\sqrt{3}$, the total distance which separates said centres (M, N) being equal to $2e+2\Delta e$, where $\Delta e$ is equal to $$\frac{e}{\cos 30°}$$

and the length of said major axis of the rotor being equal to $2R+2\Delta e+2e$ and its width to $2R+2\Delta e-2e$, where R is the radius of said ends of the rotor and equals $a-(\Delta e+s)$, where $s$ represents the radius of the rollers.

2. A machine according to claim 1, wherein the centres of the three rotating rollers (A, B, C) form the apices of an equilateral triangle, the centre of symmetry of said triangle coinciding with the centre (O) of the casing.

3. A machine according to claim 1, wherein the distance $e$ separating the centre (G) of the rotor from the centre (O) of the casing corresponds to the equation:

$$e=\sqrt{\left(\cos \varphi.d+\frac{\cos \varphi.c}{2}-a\right)^2+\left(\cos \varphi.b+\frac{\sin \varphi.c}{2}+\frac{a.\sqrt{3}}{2}\right)^2}$$

for each position of the rotor, $c$ being equal to $2e+2\Delta e$.

4. A machine according to claim 1, in which only the rotor is in motion and the casing is immobile, wherein the rotor is driven by a toothed wheel fixed and centred on the transmission shaft which passes through the centre of the casing and in engagement with an internally-toothed crown located inside the rotor.

5. A machine according to claim 1, in which only the rotor is in motion and the casing is immobile, wherein an eccentric is fixed on the transmission shaft which passes through the centre of the casing and located at the centre of a needle bearing arranged at the centre of ahe rotor.

6. A machine according to claim 1, in which the rotor and the casing constitute two masses which both turn around their own axes which are fixed and spaced from one another by the distance $e$, wherein the angular speed of the rotor is equal to the sum of the angular speed of the casing plus a half of this latter.

7. A machine according to claim 6, wherein the two masses in motion are simultaneously displaced, the rotor effecting 270° and the casing 180° while each chamber is displaced by 180°.

8. A machine according to claim 1, wherein said rotor is driven by the transmission shaft.

9. A machine according to claim 1, wherein said rotor drives the transmission shaft.

10. A machine according to claim 1, wherein said machine comprises two cylinders separated axially by a disc, said cylinders being covered on their axially outer faces by two other discs, the whole forming two rotating casings enclosing two rotors supported on a common shaft.

11. A machine according to claim 1, wherein said rollers are provided with oscillating bearing rings and spring-urged sealing rings to facilitate lubrication.

12. A machine according to claim 10, wherein one said cylinder has a greater axial width than the other said cylinder to obtain a higher level of compression.

References Cited

UNITED STATES PATENTS

| | | |
|---|---|---|
| 724,665 | 4/1903 | Cooley. |
| 724,994 | 4/1903 | Cooley. |
| 914,627 | 3/1909 | Alcorn. |
| 3,108,578 | 10/1963 | Scherenberg _________ 103—130 |
| 3,246,835 | 4/1966 | Linder _____________ 230—145 |
| 3,288,121 | 11/1966 | Linder _____________ 230—145 |

DONLEY J. STOCKING, Primary Examiner

WILBUR J. GOODLIN, Assistant Examiner

U.S. Cl. X.R.

230—145